United States Patent [19]
Kitahara

[11] Patent Number: 4,733,948
[45] Date of Patent: Mar. 29, 1988

[54] COLOR LIQUID CRYSTAL DISPLAY WITH LIGHT INTERCEPTING MEMBER

[75] Inventor: Nobuko Kitahara, Tama, Japan

[73] Assignee: Canon Kabushiki Kaisha, Tokyo, Japan

[21] Appl. No.: 809,769

[22] Filed: Dec. 17, 1985

[30] Foreign Application Priority Data

Dec. 20, 1984 [JP] Japan ................. 59-267303

[51] Int. Cl.$^4$ ............................. G02F 1/133
[52] U.S. Cl. ................... 350/339 F; 350/334
[58] Field of Search ............. 350/339 F, 339 R, 334

[56] References Cited

U.S. PATENT DOCUMENTS

| 3,840,695 | 10/1975 | Fischer | 350/334 |
| 4,367,924 | 1/1983 | Clark et al. | 350/350 S |
| 4,527,864 | 7/1985 | Dir | 350/337 |
| 4,636,038 | 1/1987 | Kitahara et al. | 350/339 R |

FOREIGN PATENT DOCUMENTS

| 0120321 | 6/1985 | Japan | 350/339 F |
| 0182417 | 9/1985 | Japan | 350/339 F |
| 60-04962 | 11/1985 | Japan | 350/330 |

OTHER PUBLICATIONS

Hayama et al., "Amorphous-Silicon Thin-Film Metal-Oxide Transistors.

Primary Examiner—John S. Heyman
Assistant Examiner—David Lewis
Attorney, Agent, or Firm—Fitzpatrick, Cella, Harper & Scinto

[57] ABSTRACT

A color liquid crystal display panel is provided with a first substrate having thin film transistors arranged in rows and columns, a gate wire connecting commonly the gates for the thin film transistors in the columns, a source wire connecting commonly the sources for the thin film transistors in the rows and display electrodes connected respectively to each of the drains for the thin film transistors, a second substrate having a common electrode opposed to said display electrodes and a color filter and a liquid crystal interposed between said first substrate and second substrate. The display panel comprises a light intercepting film provided on said second substrate at a position confronting with said thin film transistors.

9 Claims, 3 Drawing Figures

COLOR LIQUID CRYSTAL DISPLAY WITH LIGHT INTERCEPTING MEMBER

BACKGROUND OF THE INVENTION

1. Field of the Invention

This invention relates to a color liquid crystal display panel, particularly to a color liquid crystal display panel having an array of thin film transistors (hereinafter abbreviated as TFT) for performing switching per each image element.

2. Description of the Prior Art

In a photoconductive semiconductor used in a color liquid crystal display device incorporating a TFT array, if light is irradiated on TFT without light interception, the off-resistance of the transistor will be lowered to as low as one thousandth or less even without about 1,000 lux of white light irradiation. Therefore, in the prior art, as schematically shown in a sectional view in FIG. 2, on the insulating-aligning layer 6, there are provided light intercepting layers 12 and 12' at the positions corresponding to the semiconductor layer 3 to protect the semiconductor from irradiation of light so far as possible, thereby stabilizing the switching characteristics.

The insulating-aligning layer 6 is required to function as a stable protective layer for the thin film transistors. Layer 6 is generally formed as an insulating layer with a film thickness of about 1 μm between the light intercepting layer 12 formed of a metal and the source or drain electrode, and is further required to function as the aligning layer. As a result, a complicated construction of an insulating film comprising two or more layers of separate insulating and aligning layer 6 has frequently been adopted, whereby a TFT away as a whole will favorably be formed thick.

SUMMARY OF THE INVENTION

The present invention has been accomplished in view of the above drawbacks of the prior art, and its object is to make the element thinner and simplify its construction by providing a light intercepting layer for stabilizing the switching characteristics of the thin film transistors using a photoconductive semiconductor on the color filter side, rather than on the transistor side, whereby the function of the insulating-alignment layer 6 can be limited to the function of a protective layer and an aligning layer for the transistors to make the insulating layer a thin film of not more than two layers.

According to the aspect of the present invention, there is provided color liquid crystal display panel provided with a first substrate having thin film transistors arranged in rows and columns, a gate wire connecting commonly the gates for the thin film transistors on the columns, a source wire connecting commonly the source for the thin film transistors on the rows and display electrodes connected respectively to each of the drains for the thin film transistors, a second substrate having a common electrode opposed to said display electrodes and a color filter and a liquid crystal interposed between said first substrate and said second substrate, comprising a light intercepting film provided on said second substrate at a position in line with said thin film transistors.

DETAILED DESCRIPTION OF THE EMBODIMENTS OF THE INVENTION

Figure 1:
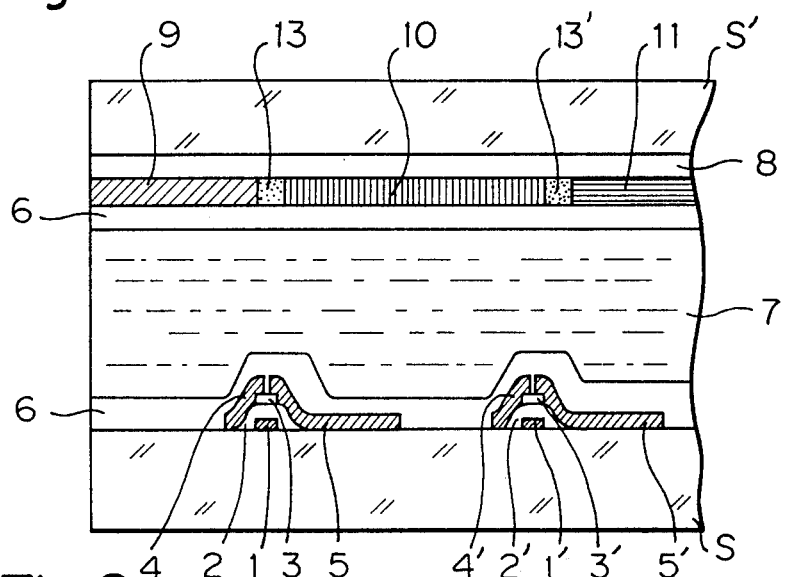
FIG. 1 is a schematic sectional view showing the basic construction of the present invention.

The technical means of the present invention is described by referring to FIG. 1.

In FIG. 1, S and S' are transparent substrates such as of glass, etc; 1 and 1' are gate wires; 2 and 2' are gate insulation layers; 3 and 3' are semiconductor layers; 4 and 4' are source wires; 5 and 5' are drain electrodes; 6 is an insulating-aligning layer; 7 is a liquid crystal; 9 is a transparent common electrode. 9 shows a red (R) filter, 10 a green (G) filter, and 11 a blue (B) filter. These filters are positioned corresponding to and opposed to the separate image element blocks on the substrate S side Such TFT's are arranged in a matrix along columns and rows, TFT's on the columns being commonly connected mutually between the gates with gate wire, while TFT's on the rows being commonly connected mutually between the source with a source wire. Further, to each TFT at the drain is connected a display electrode for image element.

On the display panel using this type of TFT, a gate-on pulse is applied by a line-at-a-time scanning system, and an information signal is applied from the source wire on the image element on the line on which the gate-on pulse is applied, whereby a display can be made.

Figure 2:
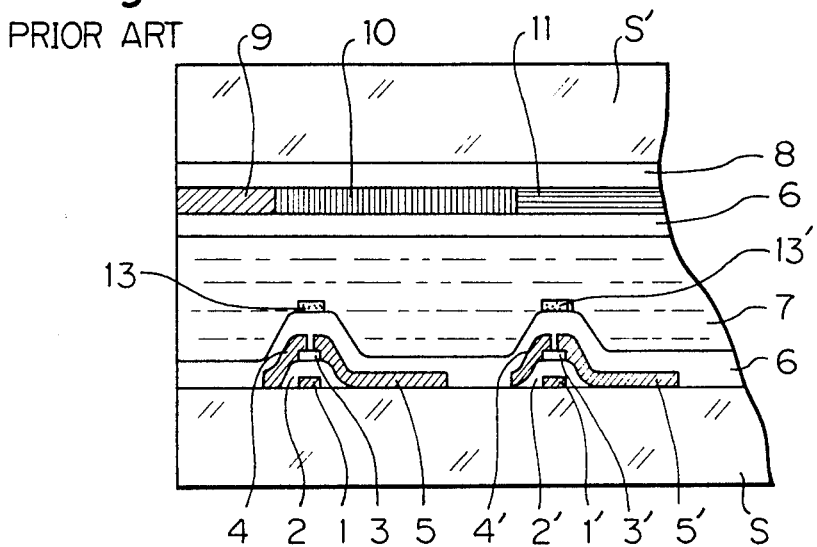
FIG. 2 is a schematic sectional view of the device of the prior art.

In the above construction, there is no light intercepting film such as provided on the TFT array side in FIG. 2, but light intercepting layers 13 and 13' are provided at positions corresponding to TFT on the color filter side. According to such a construction, light interception may be effected through the gate electrode 1 against light irradiation from the substrate S side, and through the light intercepting layers 13, 13' against light irradiation from the side of the color filters 9, 10 and 11.

Figure 3:
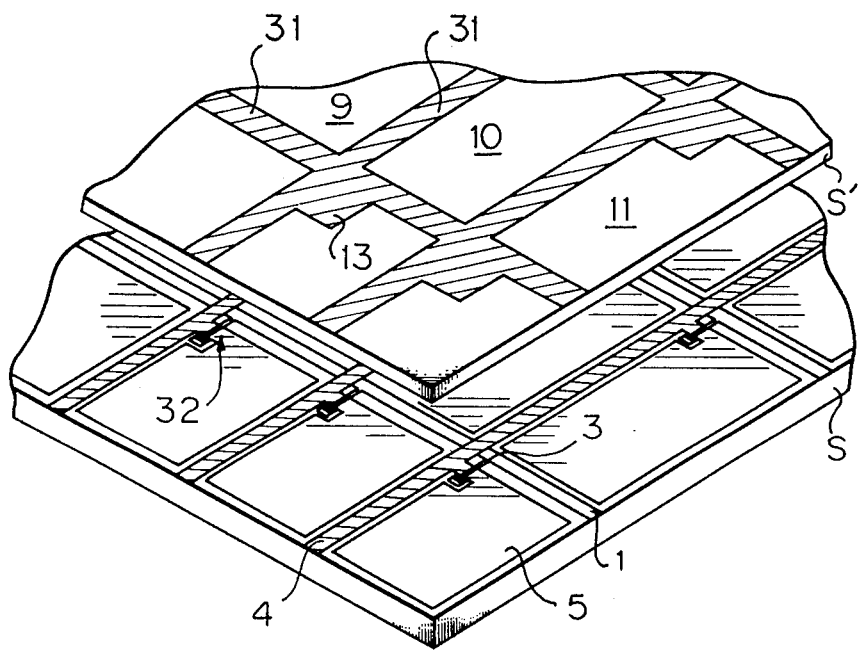
FIG. 3 is a perspective view showing an embodiment of the present invention.

FIG. 3 is an illustration showing an embodiment of the present invention. In FIG. 3, a light intercepting film 13 is provided as spread also on the positions corresponding to the source wire (metal film such as of aluminum, chromium, etc.) and the gate wire (metal film such as of aluminum, chromium, etc.) on the TFT array side, thereby covering the portions other than the display region to frame the color filter. A specific embodiment of the display panel according to the light interception pattern as shown in FIG. 3 is described below.

A color liquid crystal display cell was made by employing a substrate on the array side of TFT 32 having a silicon nitride film (film thickness 2000 Å) formed as the protective film on the TFT using amorphous silicon for the semiconductor layer 3 by a plasma CVE method and another substrate on the color filter side having color filters 9, 10 and 11 formed on the light intercepting film 13 subjected to patterning as shown in FIG. 3 by deposition of chromium of 1000 Å thick by the EB vapor deposition method, and further attaching an aligning film to each of the substrates. An irradiation experiment in the vertical direction was carried out to obtain the following results.

(1) When white light was irradiated from the TFT array side at an illuminance of 10,000 lux, no change was observed in the image contrast at all.

(2) When white light was irradiated from the color filter side at an illuminance of 10,000 lux transmission through the black portion of the image was increased from 1% to 3%, but substantially no change of the image as a whole was recognized.

As is clear from the above experimental results, an image as good as that of the prior art can be obtained substantially without any influence on the image by provision of a light intercepting film on the color filter side of the substrate.

The light intercepting film 13 may be formed of a metal film such as of aluminum or chromium, and the metal mask arranged so as to be opposed in position to the gate wire 1 and/or the source wire 4 should be preferably electrically connected to the light intercepting film 13. The metal mask 31 may be formed of aluminum or chromium. The light intercepting film 13 is preferably formed to be broader than the channel portion of the opposed TFT 32, and may be formed to have an area which is two to 10-times, preferably about 3 to 5 times, the area of the channel portion of the TFT 32. If the area of the light intercepting layer 13 is more than ten times area of the channel portion of TFT 32, the aperture ratio during display will be undesirably lowered. On the contrary, in the case of an area of the light intercepting film 13 being less than two times the area of the channel portions of TFT 32, incident light will enter the semiconductor portion of TFT 32 to result in lowering in switching characteristics of TFT 32. The light intercepting film 13 may have a film thickness of 500 Å to 2μ, preferably 1000 Å to 5000 Å, similar as the thickness of the metal mask 31.

In the present invention, a dyed resin or colored vapor deposited film may be used as the light intercepting film 13. The light intercepting film 13 for this purpose may be preferably prepared by dyeing a resin of a color having light absorption characteristic including the light absorption wavelength region of the semiconductor portion used in TFT 32 or by forming a vapor deposited film of an organic material having such a color. Particularly, the light intercepting film 13 may be selected from those having light absorption characteristic which can lower the light absorption at the maximum absorption wavelength at the semiconductor portion of TFT 32 by 50% or lower.

As the resin to be used therefor, polyvinyl alcohol may be used, and as the vapor deposited film, a vapor deposited film of a phthalocyanine pigment or a perylene pigment may be used. Since the light interception film of such an organic material does not form any capacity between the organic material and the common electrode, the voltage applied on the liquid crystal can be substantially increased. It is also more effective to form the light intercepting film 13 of the same film as the blue color filter.

The area of the light intercepting layer 13 formed of the organic material as mentioned above may be made 2 to 10-fold, preferably about 3 to 5-fold of the area of the channel portion of TFT 32.

In the present invention, as the liquid crystal 7, other than the TN (Twisted Nematic) requid crystal, a ferroelectric liquid crystal as disclosed in U.S. Pat. No. 4,367,964 (Clark et al) may be used.

As described above, according to the present invention, the TFT array preparation process can be simplified and TFT array itself can be made thinner without impairing the display characteristics.

Further, since difficulties such as a short circuit, etc. between the light intercepting film and the source drain electrode are removed, the yield can be improved to a great extent.

Moreover, by covering a portion other than the display region of the filter by expansion of the light intercepting film on the color filter side, light interception can be made more complete, whereby the effect can be achieved that the color image can be viewed distinctly and easily.

What is claimed is:

1. A color liquid crystal display panel provided with a first substrate having thin film transistors arranged in rows and columns, a gate wire connecting commonly the gates for the thin film transistors the columns, a source wire connecting commonly the sources for the thin film transistors, a second substrate having a common electrode opposed to said display electrodes and a color filter, and a liquid crystal interposed between said first substrate and said second substrate, comprising a light intercepting film provided on said second substrate at a position confronting with said thin film transistors.

2. A color liquid crystal display panel according to claim 1, wherein said light intercepting film is formed of a metal film.

3. A color liquid crystal display panel according to claim 1, wherein a metal film is provided which is confronting in position with at least one wire of the gate wire and the source wire on said first substrate, and said metal film is electrically connected to said light intercepting film.

4. A color liquid crystal display panel according to claim 3, wherein a metal film comprising said light intercepting film and the second metal film are obtained by formation of coated film on said common electrode.

5. A color liquid crystal display panel according to claim 1, wherein said thin film transistors comprise amorphous silicon formed as the semiconductor.

6. A color liquid crystal display panel according to claim 1, wherein said liquid crystal is a nematic liquid crystal.

7. A color liquid crystal display panel according to claim 1, wherein said nematic crystal is a twisted nematic crystal.

8. A color liquid crystal display panel according to claim 1, wherein said liquid crystal is a ferroelectric liquid crystal.

9. A color liquid crystal display panel provided with a first substrate having thin film transistors arranged in rows and columns, a gate wire commonly connecting the gates for the thin film transistors on the columns, a source wire commonly connecting the sources for the thin film transistors on the rows and display electrodes connected respectively to each of the drains for the thin film transistors, a second substrate having a common electrode opposed to said display electrodes and a color filter, a liquid crystal interposed between said first substrate and said second substrate, which comprises:
   a metal light intercepting film provided on said second substrate at a position facing said thin film transistors; and
   a metal mask arranged so as to be opposed in position to said gate wire and said source wire,
   said metal light intercepting film and said metal mask being electrically connected with each other, and both being formed in one plane on said common electrode, and said metal light intercepting film being formed so as to be larger than said thin film transistors and so as to be wider than said metal mask.

* * * * *

UNITED STATES PATENT AND TRADEMARK OFFICE
CERTIFICATE OF CORRECTION

PATENT NO. : 4,733,948
DATED : March 29, 1988
INVENTOR(S) : Nobuko Kitahara

It is certified that error appears in the above-identified patent and that said Letters Patent is hereby corrected as shown below:

AT ITEM [57] IN THE ABSTRACT:

Line 9, "acolor" should read --a color--.

COLUMN 1:

Line 15, "TFT" should read
        --the thin film transistors--.
    Line 17, "without" should read --with--.
    Line 33, "layer 6" should read --layers 6.
    Line 34, "away" should read --array--.
    Line 35, "favorably" should read --unfavorably--.
    Line 56, "source" should read --sources--.

COLUMN 2:

Line 14, "9 is" should read --8 is--.
    Line 19, "side" should read --side.--.
    Line 24, "source" (first occurrence) should read
        --sources--.

UNITED STATES PATENT AND TRADEMARK OFFICE
CERTIFICATE OF CORRECTION

PATENT NO. : 4,733,948

DATED : March 30, 1988

INVENTOR(S) : Nobuko Kitahara

It is certified that error appears in the above-identified patent and that said Letters Patent is hereby corrected as shown below:

COLUMN 3:

Line 1, "was" should read --contrast was--.
    Line 18, "10-times," should read --10 times,--.
    Line 21, "times area" should read --times the area--.
    Line 29, "as" should read --to--.
    Line 41, "absorption" should read --absorbance--.
    Line 55, "2" should read --2---.
    Line 56, "3 to 5-fold" should read --3- to 5-fold--.
    Line 60, "requid" should read --liquid--.
    Line 62, "4,367,964 (Clark et al)" should read --4,367,924 (Clark et al.)--.

COLUMN 4:

Line 12, "transistors the" should read --transistors --on--.
    Line 14, "film transistors," should read --film transistors on the rows and display electrodes connected respectively

UNITED STATES PATENT AND TRADEMARK OFFICE
CERTIFICATE OF CORRECTION

PATENT NO. : 4,733,948

DATED : March 29, 1988

INVENTOR(S) : Nobuko Kitahara

It is certified that error appears in the above-identified patent and that said Letters Patent is hereby corrected as shown below:

to each of the drains for the thin film transistors, --.

Signed and Sealed this

Twenty-seventh Day of February, 1990

Attest:

JEFFREY M. SAMUELS

Attesting Officer     Acting Commissioner of Patents and Trademarks